United States Patent
Chen et al.

(10) Patent No.: US 9,611,883 B2
(45) Date of Patent: Apr. 4, 2017

(54) ANTI-DROPPING DEVICE AND CONNECTION MEMBER

(71) Applicant: ZTE CORPORATION, Shenzhen, Guangdong Province (CN)

(72) Inventors: Shanjun Chen, Shenzhen (CN); Xu Li, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 38 days.

(21) Appl. No.: 14/420,329

(22) PCT Filed: Aug. 8, 2013

(86) PCT No.: PCT/CN2013/081111
§ 371 (c)(1),
(2) Date: Feb. 6, 2015

(87) PCT Pub. No.: WO2014/023253
PCT Pub. Date: Feb. 13, 2014

(65) Prior Publication Data
US 2015/0192168 A1    Jul. 9, 2015

(30) Foreign Application Priority Data
Aug. 8, 2012    (CN) .................... 2012 2 0390953 U

(51) Int. Cl.
*F16B 21/18*    (2006.01)
*F16B 41/00*    (2006.01)
(52) U.S. Cl.
CPC .................... *F16B 41/002* (2013.01)
(58) Field of Classification Search
CPC .......... F16B 39/10; F16B 39/24; F16B 41/00; F16B 41/002; F16B 43/00; F16B 21/18
(Continued)

(56) References Cited

U.S. PATENT DOCUMENTS 103,780 A  *  5/1870  Rutter ..................... F16B 39/24
                                                          411/131
273,871 A  *  3/1883  Meason .................. F16B 39/10
                                                          411/984
(Continued)

FOREIGN PATENT DOCUMENTS

CN    202756396 U    2/2013
DE    20200414 U1    5/2002
(Continued)

OTHER PUBLICATIONS

International Search Report (Form PCT/ISA/210) for PCT/CN2013/081111 mailed Nov. 21, 2013.
(Continued)

*Primary Examiner* — Roberta Delisle
(74) *Attorney, Agent, or Firm* — Koppel, Patrick, Heybl & Philpott

(57)    ABSTRACT

An anti-dropping device and connection member, wherein the anti-dropping device comprises a connection member (40) and an anti-dropping boss (60); wherein the connection member (40) comprises: a first hole (42), which is adapted to a cross section of the anti-dropping boss (60) and configured to rotatably sheath the connection member (40) onto the anti-dropping boss (60); at least one second hole (44), which is configured to rotatably sheath a screw (10) into the connection member (40); and at least one connecting part (46), both ends of the connecting part (46) being respectively connected to the first hole (42) and the second hole (44); one end of the anti-dropping boss (60) is fixed on an apparatus (70) and is configured to fix the connection member (40) to the apparatus (70), thus facilitating operation and ensuring good safety during use of screws.

19 Claims, 4 Drawing Sheets

(58) Field of Classification Search
USPC .................................. 411/352, 353, 531, 546
See application file for complete search history.

(56) References Cited

U.S. PATENT DOCUMENTS

| | | | | |
|---|---|---|---|---|
| 335,941 A * | 2/1886 | Lovelidge | ............... | F16B 39/10 411/100 |
| 347,147 A * | 8/1886 | Anderson | ............... | F16B 39/24 411/131 |
| 434,574 A * | 8/1890 | Wells | ................... | F16B 39/10 411/130 |
| 437,276 A * | 9/1890 | Bauer | ................... | F16B 39/24 279/100 |
| 467,107 A * | 1/1892 | Wiley | ................... | F16B 39/24 411/159 |
| 704,617 A * | 7/1902 | Coleman | ................ | F16B 39/10 411/100 |
| 804,580 A * | 11/1905 | Burnham | ................ | F16B 39/24 411/101 |
| 887,382 A * | 5/1908 | Diplock | ................ | F16B 39/10 411/102 |
| 912,407 A * | 2/1909 | Pinson | ................ | F16B 39/10 411/99 |
| 986,539 A * | 3/1911 | Battin | ................ | F16B 39/24 411/132 |
| 1,037,384 A * | 9/1912 | White | ................... | F16B 39/24 411/155 |
| 1,154,813 A * | 9/1915 | Sellers | ................ | F16B 39/10 411/128 |
| 1,200,285 A * | 10/1916 | Whyman | ................ | F16B 39/10 411/102 |
| 1,232,024 A * | 7/1917 | Garland et al. | ......... | F16B 39/10 411/91 |
| 1,233,342 A * | 7/1917 | Gracey | ................... | F16B 39/24 411/129 |
| 1,344,684 A * | 6/1920 | Eisenhart | ................ | F16B 39/10 411/130 |
| 1,353,776 A * | 9/1920 | Mills | ....................... | F16B 39/10 411/130 |
| 1,446,219 A * | 2/1923 | Stanley | ................... | F16B 43/00 470/49 |
| 1,835,710 A | 1/1931 | Jenkins et al. | | |
| 1,900,195 A * | 3/1933 | Olson | ................... | F16B 39/24 403/209 |
| 5,174,702 A | 12/1992 | Dolin | | |
| 2003/0210968 A1 | 11/2003 | Miyamura et al. | | |
| 2009/0052151 A1 | 2/2009 | Hung et al. | | |
| 2009/0060674 A1* | 3/2009 | Kluga | ................... | F16B 39/24 411/149 |
| 2012/0152201 A1 | 6/2012 | Salameh | | |

FOREIGN PATENT DOCUMENTS

| | | |
|---|---|---|
| DE | 202008001327 U1 | 7/2009 |
| DE | 102010035350 A1 | 3/2012 |
| DE | 102010041030 A1 | 3/2012 |
| EP | 2278177 A2 | 1/2011 |
| FR | 2678352 A | 12/1992 |
| FR | 2796427 A1 | 1/2001 |
| FR | 2897124 A1 | 2/2006 |

OTHER PUBLICATIONS

European Search Report for Application No. 13827085.5—1760/2884120 PCT/CN2013081111 dated Jul. 24, 2015.

* cited by examiner

ANTI-DROPPING DEVICE AND CONNECTION MEMBER

TECHNICAL FIELD

The disclosure refers to the field of assembly, including, e.g., an anti-dropping device and a connection member.

BACKGROUND

Screws, as standard parts, can achieve the easy, fast and reliable connection between different parts. Currently, a large amount of fasteners such as screws are used for the fastening and installation of modules and apparatuses in various fields. Due to the limited installation sequence of parts, the installation of many of the parts needs to carried out at a high altitude, which requires that the falling of the screws are prevented during the use thereof or after the installation is finished. The purpose is to prevent the damage to a person due to the falling of the screw, or to avoid that it is difficult to find the screw after it falls down and further, there is a need to climb up and reinstall.

Some of the existing screw anti-dropping solutions are that: using the method of sheathing an elastic member between screws, or using the method of that a screw and an individual anti-dropping member are sheathed together by an elastic member, so as to realize the anti-dropping function by means of the individual anti-dropping member. There are drawbacks in these methods as follows: the elastic member would rotate during the installation and fastening of the screw; the elastic member may be directly bended; the anti-dropping member needs to be designed separately; and the stuck or over-tightened situation exists between the anti-dropping member and the elastic member, and eventually resulting in an inconvenient operation or a failure.

For the problems of the inconvenient of the anti-dropping solutions in the related art, no effective solution has been yet proposed at the present.

SUMMARY

For the problems of the inconvenient of the anti-dropping solutions in the related art, an anti-dropping device and a connection member are provided in the embodiment of the disclosure, so as to at least solve one of the above-mentioned problems.

According to one aspect of the disclosure, An anti-dropping device is provided, which comprises a connection member 40 and an anti-dropping boss 60, wherein the connection member 40 comprises: a first hole 42, which is adapted to the cross section of the anti-dropping boss 60 and configured to rotatably sheath the connection member 40 onto the anti-dropping boss 60; at least one second hole 44, which is configured to rotatably sheath a screw 10 into the connection member 40; and at least one connecting part 46, both ends of the connecting part 46 being respectively connected to the first hole 42 and the second hole 44, and one end of the anti-dropping boss 60 is fixed to an apparatus 70 and is configured to fix the connection member 40 to the apparatus 70.

According to an embodiment of the utility model, the anti-dropping boss 60 and the apparatus 70 are integrally formed by processing.

According to an embodiment of the utility model, a fixing member 50 is further comprised, which is configured to be fixed to one end of the anti-dropping boss 60 away from the apparatus 70, the fixing member 50 being provided with an annular protruding edge, the radius of the annular protruding edge being greater than that of the first hole 42.

According to an embodiment of the utility model, the connecting part 46 is of a circular arc shape.

According to an embodiment of the utility model, the first hole 42 is a waist-shaped hole, and/or the second hole 44 is a waist-shaped hole.

According to an embodiment of the utility model, the device further comprises an axle sleeve 20, which is sheathed in the connection member 40 via the second hole 44 and configured to be fixed to an outer surface of the screw 10, wherein an outer radius of one end of the axle sleeve 20 close to the apparatus 70 is greater than a radius of the second hole 44.

According to an embodiment of the utility model, an outer radius of one end of the axle sleeve 20 away from the apparatus 70 is able to be extended to be greater than the radius of the second hole 44.

According to an embodiment of the utility model, an inner wall of the axle sleeve 20 is provided with a screw thread, and the axle sleeve 20 is rotated by means of the screw thread to a non-threaded portion of the screw 10 for the purpose of fixing.

According to an embodiment of the utility model, a screw thread of the screw 10 is machined such that the axle sleeve 20 is fixed to a non-threaded portion of the screw 10.

According to an embodiment of the utility model, the axle sleeve 20 is fixed to the outer surface of the screw 10 after the second hole 44 is sheathed onto the screw 10, wherein the outer radius of the end of the axle sleeve 20 close to the apparatus 70 is greater than the radius of the second hole 44.

According to another aspect of the disclosure, a connection member 40 is provided, comprising: a first hole 42, which is adapted to a cross section of an anti-dropping boss 60 and configured to rotatably sheath the connection member 40 onto the anti-dropping boss 60, wherein the anti-dropping boss 60 is fixedly provided on an apparatus 70; at least one second hole 44, which is configured to be rotatably sheathed onto a screw 10; and at least one connecting part 46, both ends of the connecting part 46 being respectively connected to the first hole 42 and the second hole 44.

According to the embodiment of the disclosure, an anti-dropping device is employed. The anti-dropping device comprises a connection member 40 and an anti-dropping boss 60, wherein the connection member 40 comprises: a first hole 42, which is adapted to a cross section of the anti-dropping boss 60 and configured to rotatably sheath the connection member 40 onto the anti-dropping boss 60; at least one second hole 44, which is configured to rotatably sheath a screw 10 into the connection member 40; and at least one connecting part 46, both ends of the connecting part 46 being respectively connected to the first hole 42 and the second hole 44, and one end of the anti-dropping boss 60 is fixed to an apparatus 70 and is configured to fix the connection member 40 to the apparatus 70, so that the disclosure solves the problems of inconvenient anti-dropping operation and the dropping of screws during use in the related art, such that a convenient operation and good safety are obtained during use of screws.

DESCRIPTION OF THE DRAWINGS

The accompanying drawings described herein are used to provide a further understanding of the disclosure, and constitute a part of the present application, and the exemplary embodiments the disclosure and the description thereof serve to explain the disclosure, and do not constitute improper limitations of the disclosure. In the accompanying drawings.

EMBODIMENTS OF THE UTILITY MODEL

The disclosure will be described in detail below with reference to the drawings and in combination with examples. It should be noted that the embodiments in the present application and the features in the embodiments can be combined with each other if there is no conflict.

Figure 1:
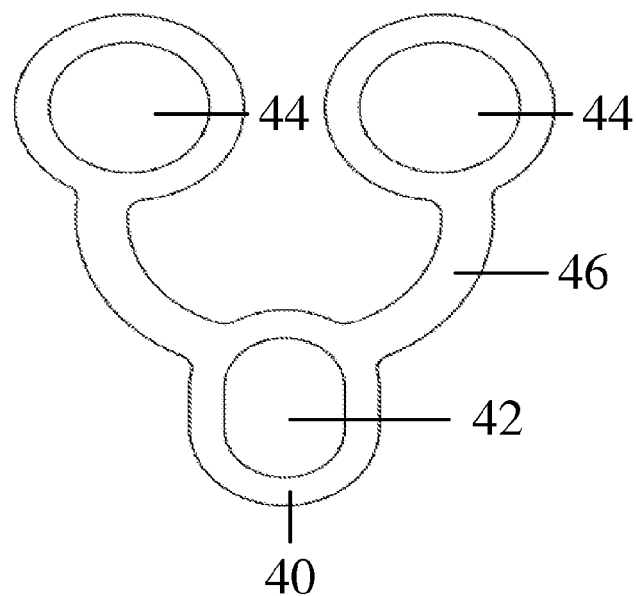
FIG. 1 is a schematic diagram of a preferred connection member according to an embodiment of the disclosure.
Figure 2:
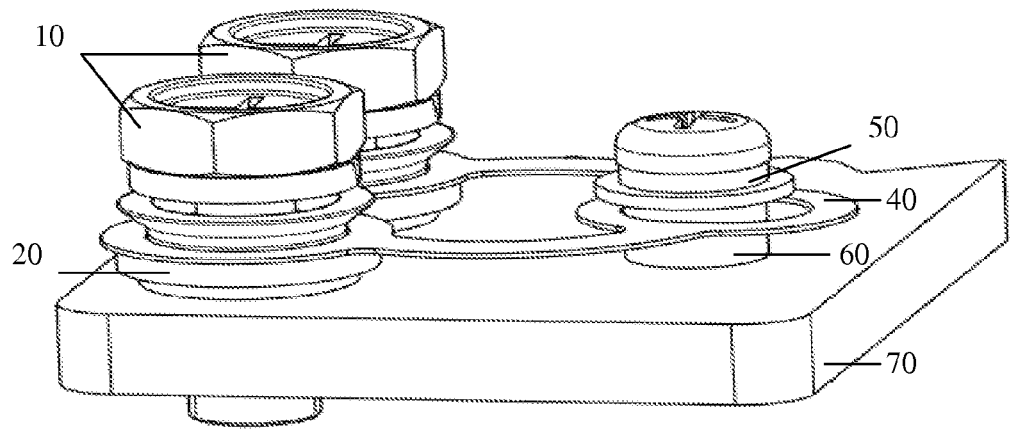
FIG. 2 is an overall schematic diagram of a preferred anti-dropping device according to an embodiment of the disclosure.

In this embodiment, a connection member 40 is provided, wherein FIG. 1 is a schematic diagram of a preferred connection member 40 according to an embodiment of the disclosure, FIG. 2 is an overall schematic diagram of a preferred anti-dropping device according to an embodiment of the disclosure, as shown in FIGS. 1 and 2, the connection member 40 comprises:

a first hole 42, which is adapted to the cross section of a anti-dropping boss 60 and configured to rotatably sheath the connection member 40 onto the anti-dropping boss 60, wherein the anti-dropping boss 60 is fixed on an apparatus 70;

at least one second hole 44, which is configured to be rotatably sheathed onto a screw 10; and at least one connecting part 46, both ends of the connecting part 46 being respectively connected to the first hole 42 and the second hole 44. Preferably, the connection member 40 may be an elastic member.

In this embodiment, by means of the above-mentioned components, the first hole 42 is sheathed onto the anti-dropping boss 60 of the apparatus 70, so that the connection member 40 is fixed to the apparatus 70, and the screw 10 is sheathed in the connection member 40 via the at least one second hole 44 on the connection member 40, such that it is hard for the screw to escape from the connection member 40 during the use of the screw 10, and thereby achieving the function of anti-dropping. Moreover, since the connection member 40 is fixedly sheathed onto the apparatus 70, the screw 10 would not rotate following the connection member 40 due to the vibration of the connection member 40 during the use of the screw 10, so that the rotation and dropping-off of the screw 10 would be avoided. The problems of inconvenient anti-dropping operation and the falling of screws during use in the related art are solved, such that a convenient operation and good safety are obtained during use of screws.

Figure 3:
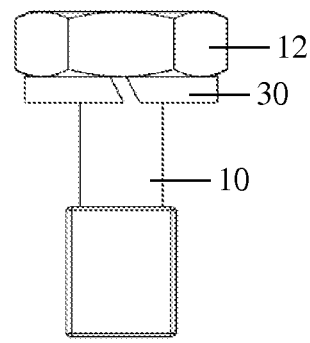
FIG. 3 is a schematic diagram of a preferred combination screw according to an embodiment of the disclosure.
Figure 3A:
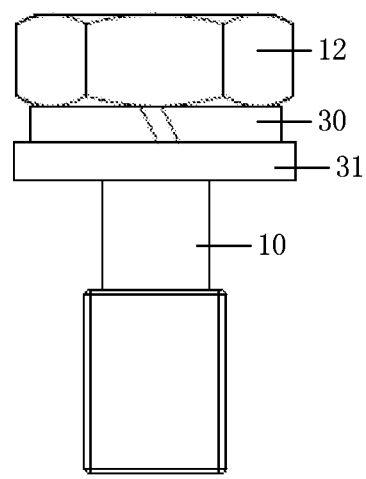
FIG. 3a is a second schematic diagram of the preferred combination screw according to an embodiment of the disclosure.

According to an embodiment of the disclosure, FIG. 3 is a schematic diagram of a preferred combination screw according to an embodiment of the disclosure, as show in FIG. 3, the above-mentioned screw 10 may be a combination screw. The combination screw comprises a separate screw 12 and spring washer 30. FIG. 3a is a second schematic diagram of the preferred screw combination according to an embodiment of the disclosure, and what is differs from FIG. 3 is that the combination screw comprises a separate screw 12, spring washer 30 and flat washer 31.

As a preferred embodiment, as illustrated with reference to FIGS. 1 and 2, the connecting part 46 may be of a circular arc shape. In this way, when the screw 10 moves in a direction perpendicular to the plane of the connection member 40, a force which is applied in the perpendicular direction of the connecting part 46 is diffused to both ends of the connecting part 46, thereby the occurrence of direct bending of the connecting portion 46 can be prevented, and the service life of the connection member 40 is to be extended.

According to an embodiment of the disclosure, the first hole 42 may be a waist-shaped hole, and the second hole 44 also may be a waist-shaped hole.

Figure 4:
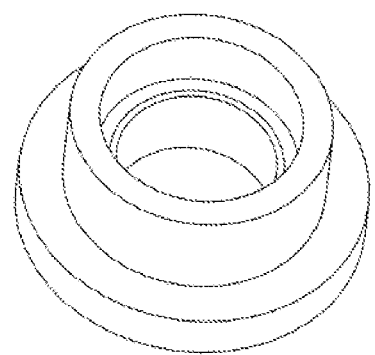
FIG. 4 is a schematic diagram of a preferred axle sleeve according to an embodiment of the disclosure.
Figure 5:
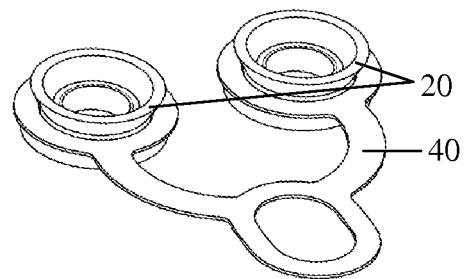
FIG. 5 is a schematic diagram of a preferred connection member according to an embodiment of the disclosure in an installed state.

As a preferred embodiment, an axle sleeve 20 may also be respectively sheathed in the second hole 44. FIG. 4 is a schematic diagram of a preferred axle sleeve 20 according to an embodiment of the disclosure, and FIG. 5 is a schematic diagram of a preferred connection member according to an embodiment of the disclosure in an installed state; as shown in FIGS. 4 and 5, the axle sleeve 20 can be sheathed in the connection member 40 via the second hole 44, an outer radius of one end of the axle sleeve 20 close to the apparatus 70 is greater than the radius of the second hole 44, and the axle sleeve 20 can be fixed to the screw 10, so as to prevent the screw 10 from falling out of the connection member 40. In this way, since the axle sleeve 20 is sheathed in the second hole 44, and the outer radius of one end of the axle sleeve 20 close to the apparatus 70 is greater than the radius of the second hole 44, it is hard for the axle sleeve 20 to fall out of the connection member. Furthermore, the axle sleeve 20 is fixed to the screw 10, it is more hard for the screw 10 to fall out of the connection member 40 during use, so that the anti-dropping effect is improved. Moreover, due to the existence of the axle sleeve 20, the detachment of the connection member 40 from the surface of the screw 10 is achieved, so that the connection member 40 and the screw 10 would not follow each other during the rotation, and the connection member 40 may have the anti-dropping function for a variety of types of screws 10, thus avoiding the need for a separate design of the connection member 40, and improving the range of application of the connection member 40.

According to an embodiment of the disclosure, as shown with reference to FIGS. 4 and 5, in case that the axle sleeve 20 is sheathed onto the connection member 40 via the second hole 44, the outer radius of one end of the axle sleeve away from the apparatus 70 is able to be extended to be greater than the radius of second hole 44. In this manner, the screw 10, no matter in the process of moving in an upward or downward movement, would not be disengaged from the connection member 40, so as to further enhance the anti-dropping effect.

In order to fix the axle sleeve 20 to the screw 10, two preferred embodiments are provided in the disclosure as follows:

Embodiment 1, an inner wall of the axle sleeve 20 may be provided with a screw thread, such that the axle sleeve 20 is rotated by means of the thread to a non-threaded portion of the screw 10, which achieves the function of fixing the position.

Embodiment 2, the inner wall of the axle sleeve 20 may be not provided with a screw thread. For example, during the processing of the screw 10, the axle sleeve 20 is firstly sheathed to a non-threaded portion of the screw 10, and then the screw 10 is processed in a threaded manner, so that the axle sleeve 20 is fixed to the non-threaded portion of the screw 10, which can also achieves the function of fixing the position.

In this embodiment, a further anti-dropping device is provided, as shown with reference to FIG. 2, the anti-dropping device comprises the above connection member 40 and the anti-dropping boss 60, wherein the connection member 40 comprises: a first hole 42, which is adapted to the cross section of the anti-dropping boss 60 and configured to rotatably sheath the connection member 40 onto the anti-dropping boss 60; at least one second hole 44, which is configured to rotatably sheath a screw 10 into the connection member 40; and at least one connecting part 46, both ends of the connecting part 46 being respectively connected to the first hole 42 and the second hole 44, and one end of the anti-dropping boss 60 is fixed to an apparatus 70 and is configured to fix the connection member 40 to the apparatus 70.

In this embodiment, by means of the above-mentioned components, the first hole 42 is sheathed onto the anti-dropping boss 60 of the apparatus 70, so that the connection member 40 is fixed to the apparatus 70, and the screw 10 is sheathed in the connection member 40 via the at least one second hole 44 on the connection member 40, such that it is hard for the screw to escape from the connection member 40 during the use of the screw 10, and thereby achieving the function of anti-dropping. Moreover, since the connection member 40 is fixedly sheathed onto the apparatus 70, the screw 10 would not rotate following the connection member 40 due to the vibration of the connection member 40 during the use of the screw 10, so that the rotation and dropping-off of the screw 10 would be avoided. The problems of inconvenient anti-dropping operation and the falling of screws during use in the related art are solved, such that a convenient operation and good safety are obtained during use of screws. Moreover, due to the existence of the anti-dropping boss 60, there is a certain connection space between the connection member 40 and the apparatus 70, thus avoiding the case of the connection member 40 being stuck or over-tightened, and further facilitating the operation during the installing of the screw 10.

Preferably, the anti-dropping boss 60 may be fixed to the apparatus 70 in a fastened manner, or may be integrally formed with the apparatus 70 by processing. This method is easy to implement.

During the implementation, there are many manners to sheath the connection member 40 onto the anti-dropping boss 60, for example, since the connection member 40 is an elastic member, the radius of a port at one end of the anti-dropping boss 60 away from the apparatus 70 may be set to be slightly larger than that of the first hole 42, so that it is not easy for the connection member 40 to fall out of the port after a user applies a force to sheath the connection member 40 onto the anti-dropping 60 boss, and the effect of sheathing the connection member 40 onto the anti-dropping 60 is achieved; however, this method would result in the inconvenient of sheathing due to the different elastic properties of the connection member 40. In this embodiment, another preferred implementing mode is further provided, as shown in FIG. 2, the anti-dropping boss 60 is of a column shape. After the connection member 40 is sheathed into the anti-dropping boss 60, the fixing member 50 is fixed to one end of the anti-dropping boss 60 away from the apparatus 70. Since the fixing member 50 is generally provided with an annular protruding edge, and the radius of the annular protruding edge is greater than that of the first hole 42, after the fixing member 50 is fixed, the effect of sheathing the connection member 40 onto the anti-dropping boss 60 can also be achieved, and this sheathing method would not result that the connection member 40 cannot be sheathed into the anti-dropping boss 60 due to the different elastic properties of the connection member 40, and thus the range of application of this solution is improved. The fixing member 50 may be a screw, a rivet and the like.

The following will be described in connection with preferred embodiments, the following preferred embodiment and the preferred embodiments are combined with the above embodiment and the implementing mode thereof.

Embodiment 1

A screw anti-dropping solution is provided in the present preferred embodiment, such as in the case of preventing the screw from falling down when parts are assembled at a high altitude, of course, it may also be extended to relevant aspects in other fields.

In the screw anti-dropping solution, the rotation of the connection between the connection member and the screw is solved by the screw sleeve during that the screw is screw up. The connection member is directly sheathed onto the anti-dropping bosses designed on the apparatus, so that the problem of that the screw drops from the high altitude during the component installation is solved. Meanwhile, this solution improves the easiness and reliability of installation.

The screw anti-dropping solution may include: a combination screw 10 (including a screw 12 and a spring washer 30), an axle sleeve 20, a connection member 40, and a fixing member 50. The spring washer 30 is installed on the separate screw 12 to form the combination screw 10; the axle sleeve 20 is installed on the combination screw 10 and is assembled with one end of the connection member 40; the other end of the connection member 40 is directly sheathed onto the anti-dropping boss 60 of the apparatus 70; and then the fixing member 50 is fixed to the anti-dropping boss 60 of the apparatus 70, so that the anti-dropping function of the combination screw 10 is achieved. By means of the axle sleeve 20 connecting the combination screw 10 with the connection member 40, the rotation of the connection member 40 during tightening the combination screw 10 can be prevented.

The connection member 40 may be an elastic member (such as a plastic member), a second hole at one end of the connection member 40 is sheathed to a flange position on the axle sleeve 20, and then the flanged end of the axle sleeve 20 is flared to prevent the connection member 40 from falling off. The connection member 40 may be provided with a plurality of second holes 44 sheathed with the axle sleeve 20 for achieving anti-dropping solutions for different number of screws.

The diameter of the second hole 44 of the connection member 40 sheathed with the axle sleeve 20 and the diameter of the first hole 42 sheathed with the fixing member 50 can be increased according to requirements, or the second hole 44 of the connection member 40 sheathed with the axle sleeve 20 and the first hole 42 sheathed with the fixing member 50 are configured as waist-shaped holes, such that after the connection member 40 is sheathed to the anti-dropping boss, the active space of the combination screw 10 can be bigger, thus ensuring the installation operation more smooth.

The portion on the connection member 40 for connecting the second holes (i.e. the above-mentioned connecting part 46) may be configured to be of a circular arc shape, so that after the fixing member 50 and the combination screw 10 are installed, the connection member 40 can effectively prevent the occurrence of direct bending.

The inner wall, which is matched with the combination screw 10, of the axle sleeve 20 may be provided with a screw thread, the dimensions of the screw thread are the same as that of the screw thread of the combination screw 10, and during assembly, the axle sleeve can be prevented falling off by rotating the combination screw 10 from the threaded portion to the smooth rod portion. The inner wall, which is matched with the combination screw 10, of the axle sleeve 20 may also not be designed with a thread, for example, before the combination screw 10 is processed in a threaded manner, the axle sleeve 20 and the combination screw 10 are assembled, and then the combination screw 10 is threaded, so as to achieve that the axle sleeve 20 would not fall off.

The end of the fixing member 50 fixed to the connection member 40 is positioned on the anti-dropping boss 60 of the apparatus, and the fixing member 50 may be use a screw, a rivet and the like in various forms.

With the screw anti-dropping solution, the disclosure can obtain the following progresses and effects: convenient to install and maintain; simple structure, easy to operate; easy to produce, low costs; and high versatility.

Embodiment 2

As shown in FIG. 2, the axle sleeve 20 is assembled with the combination screw 10 in a threaded manner or by other means, ensuring that the axle sleeve 20 would not fall off after the assembly. The first hole 42 at the other end of the connection member 40 is sheathed onto the anti-dropping boss 60, which is configured on the apparatus, and the fixing member 50 is fixed onto the anti-dropping boss 60, so as to prevent the connection member 40 from falling off the end, so that the anti-dropping design of the combination screw 10 during detachment is achieved.

As shown in FIG. 3, the screw 12 and the spring washer 30 form a combination screw 10, the screw 12 is provided with a smooth rod, and the smooth rod is assembled with the spring washer 30. Instead, as shown in FIG. 3a, the screw 12, the spring washer 30 and the flat washer 31 form a combination screw 10, the screw 12 is provided with a smooth rod, and the smooth rod is assembled with the spring washer 30 and the flat washer 31.

As shown in FIG. 5, the second hole 44 at one end of the connection member 40 is sheathed to a flange position on the axle sleeve 20, and then the flanged end of the axle sleeve 20 is flared to prevent the connection member 40 from falling off. One connection member 40 can be designed to be matched with a plurality of axle sleeves 20 for satisfying the requirements for preventing a plurality of screws from falling off.

As shown in FIG. 4, the axle sleeve 20 may be configured to be of a flanged structure, according to the matching mode thereof with the combination screw 10, a through hole in the middle of the axle sleeve 20 may be designed to be of a threaded structure, and may also be of a non-threaded structure.

As shown in FIG. 1, the diameter of the second hole 44 of the connection member 40 sheathed with the axle sleeve 20 and the diameter of the first hole 42 of the connection member sheathed with the fixing member 50 can be increased according to requirements, or the second hole 44 of the connection member 40 sheathed with the axle sleeve 20 and the first hole 42 of the connection member sheathed with the fixing member 50 are arranged as waist-shaped holes, so as to help to make the active space of the combination screw 10 bigger after the connection member is sheathed to anti-dropping boss 60. The portion on the connection member 40 between the second holes may be configured to be of a circular arc shape, so as to prevent the occurrence of direct bending of the connection member 40 after the combination screw 10 is installed. Furthermore, the material of the connection member 40 can also be replaced by other elastic materials.

Embodiment 3

As shown in FIG. 4, the axle sleeve 20 may be configured to be of a non-flanged structure, according to the matching mode thereof with the combination screw 10, a through hole in the middle of the axle sleeve 20 may be designed to be of a threaded structure, and may also be of a non-threaded structure.

As shown in FIG. 3, the screw 12 and the spring washer 30 form a combination screw 10, the screw 12 is provided with a smooth rod, and the smooth rod is assembled with the spring washer 30. Instead, as shown in FIG. 3a, the screw 12, the spring washer 30 and the flat washer 31 form a combination screw 10, the screw 12 is provided with a smooth rod, and the smooth rod is assembled with the spring washer 30 and the flat washer 31.

Figure 6:
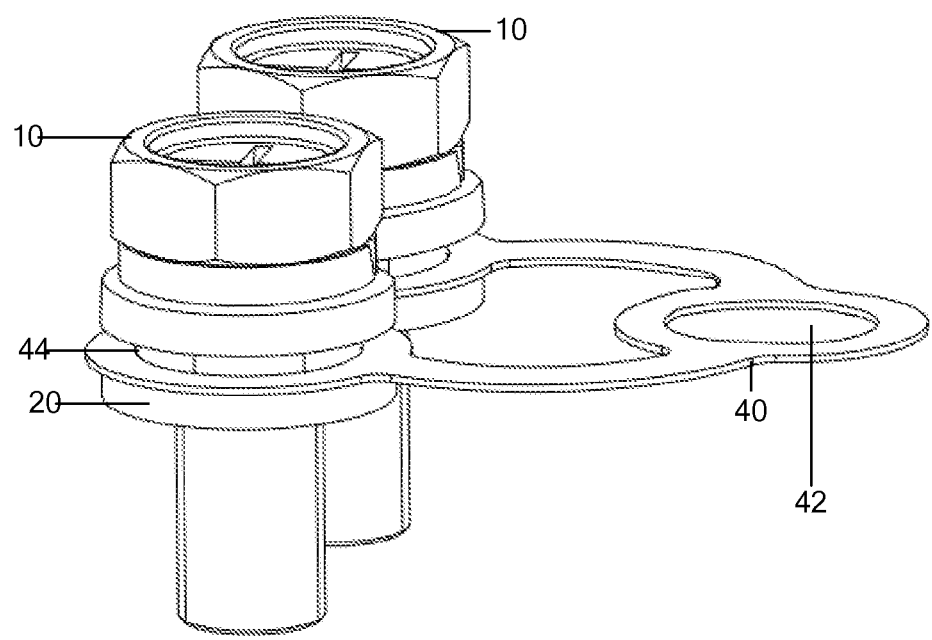
FIG. 6 is a second schematic diagram of the preferred connection member according to an embodiment of the disclosure in the installed state.

FIG. 6 is a second schematic diagram of the preferred connection member according to an embodiment of the disclosure in the installed state, as shown in FIGS. 6 and 2, the second hole 44 at one end of the connection member 40 is sheathed to the smooth rod portion of the combination screw 10, and then the axle sleeve 20 is assembled with the combination screw 10 in a threaded manner or by other means, ensuring that the axle sleeve 20 would not fall off after the assembly. The first hole 42 at the other end of the connection member 40 is then sheathed onto the anti-dropping boss 60, which is configured on the apparatus, and the fixing member 50 is fixed onto the anti-dropping boss 60, so as to prevent the connection member 40 from falling off the end, so that the anti-dropping design of the combination screw 10 during detachment is achieved.

The above described is only the preferred embodiment of the disclosure, and is not intended to limit the disclosure, and for a person skilled in the art, the disclosure may have various alterations and changes. Any modification, equivalent replacement and improvement made within the spirit and principle of the disclosure should be included within the scope of protection of the disclosure.

What is claimed is:

1. An anti-dropping device, comprising a connection member (40) and an anti-dropping boss (60), wherein, the connection member (40) comprises:
   a first hole (42), which is adapted to a cross section of the anti-dropping boss (60) and configured to rotatably sheath the connection member (40) onto the anti-dropping boss (60);
   at least one second hole (44), which is configured to rotatably sheath a screw (10) into the connection member (40); and at least one connecting part (46), both ends of the connecting part (46) being respectively connected to the first hole (42) and the second hole (44);

one end of the anti-dropping boss (60) is fixed to an apparatus (70) and is configured to fix the connection member (40) to the apparatus (70); and an axle sleeve (20), which is sheathed in the connection member (40) via the second hole (44) and configured to be fixed to an outer surface of the screw (10), wherein an outer radius of one end of the axle sleeve (20) close to the apparatus (70) is greater than a radius of the second hole (44).

2. The anti-dropping device according to claim 1, wherein the anti-dropping boss (60) and the apparatus (70) are integrally formed by processing.

3. The anti-dropping device according to claim 2, further comprising:

an axle sleeve (20), which is sheathed in the connection member (40) via the second hole (44) and configured to be fixed to an outer surface of the screw (10), wherein an outer radius of one end of the axle sleeve (20) close to the apparatus (70) is greater than a radius of the second hole (44).

4. The anti-dropping device according to claim 3, wherein an outer radius of one end of the axle sleeve (20) away from the apparatus (70) is able to be extended to be greater than the radius of the second hole (44).

5. The anti-dropping device according to claim 1, further comprising:

a fixing member (50), which is configured to be fixed to one end of the anti-dropping boss (60) away from the apparatus (70), the fixing member (50) being provided with an annular protruding edge, the radius of the annular protruding edge being greater than that of the first hole (42).

6. The anti-dropping device according to claim 5, further comprising:

an axle sleeve (20), which is sheathed in the connection member (40) via the second hole (44) and configured to be fixed to an outer surface of the screw (10), wherein an outer radius of one end of the axle sleeve (20) close to the apparatus (70) is greater than a radius of the second hole (44).

7. The anti-dropping device according to claim 6, wherein an outer radius of one end of the axle sleeve (20) away from the apparatus (70) is able to be extended to be greater than the radius of the second hole (44).

8. The anti-dropping device according to claim 1, wherein the connecting part (46) is of a circular arc shape.

9. The anti-dropping device according to claim 8, further comprising:

an axle sleeve (20), which is sheathed in the connection member (40) via the second hole (44) and configured to be fixed to an outer surface of the screw (10), wherein an outer radius of one end of the axle sleeve (20) close to the apparatus (70) is greater than a radius of the second hole (44).

10. The anti-dropping device according to claim 1, wherein the first hole (42) is a waist-shaped hole, and/or the second hole (44) is a waist-shaped hole.

11. The anti-dropping device according to claim 10, further comprising:

an axle sleeve (20), which is sheathed in the connection member (40) via the second hole (44) and configured to be fixed to an outer surface of the screw (10), wherein an outer radius of one end of the axle sleeve (20) close to the apparatus (70) is greater than a radius of the second hole (44).

12. The anti-dropping device according to claim 11, wherein an outer radius of one end of the axle sleeve (20) away from the apparatus (70) is able to be extended to be greater than the radius of the second hole (44).

13. The anti-dropping device according to claim 1, wherein an outer radius of one end of the axle sleeve (20) away from the apparatus (70) is able to be extended to be greater than the radius of the second hole (44).

14. The anti-dropping device according to claim 13, wherein an inner wall of the axle sleeve (20) is provided with a screw thread, and the axle sleeve (20) is rotated by means of the screw thread to a non-threaded portion of the screw (10) for the purpose of fixing.

15. The anti-dropping device according to claim 13, wherein a screw thread of the screw (10) is machined such that the axle sleeve (20) is fixed to a non-threaded portion of the screw (10).

16. The anti-dropping device according to claim 1, wherein an inner wall of the axle sleeve (20) is provided with a screw thread, and the axle sleeve (20) is rotated by means of the screw thread to a non-threaded portion of the screw (10) for the purpose of fixing.

17. The anti-dropping device according to claim 1, wherein a screw thread of the screw (10) is machined such that the axle sleeve (20) is fixed to a non-threaded portion of the screw (10).

18. The anti-dropping device according to claim 1, wherein the axle sleeve (20) is fixed to the outer surface of the screw (10) after the second hole (44) is sheathed onto the screw (10).

19. A connection member (40), comprising:

a first hole (42), which is adapted to a cross section of an anti-dropping boss (60) and configured to rotatably sheath the connection member (40) onto the anti-dropping boss (60), wherein the anti-dropping boss (60) is fixedly provided on an apparatus (70);

at least one second hole (44), which is configured to be rotatably sheathed onto a screw (10), wherein the second hole (44) is configured to sheath an axle sleeve (20) in the connection member (40), the axle sleeve (20) is configured to be fixed to an outer surface of the screw (10), wherein an outer radius of one end of the axle sleeve (20) close to the apparatus (70) is greater than a radius of the second hole (44); and at least one connecting part (46), both ends of the connecting part (46) being respectively connected to the first hole (42) and the second hole (44).

* * * * *